Nov. 30, 1937.  N. R. STANSEL  2,100,880
METHOD OF FLASH WELDING
Filed Jan. 2, 1936
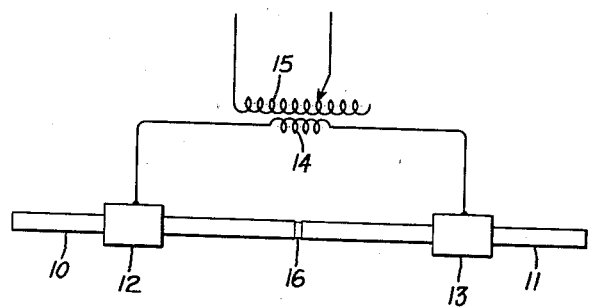
Inventor:
Numan R. Stansel,
by Harry E. Dunham
His Attorney.

Patented Nov. 30, 1937

2,100,880

UNITED STATES PATENT OFFICE 2,100,880

METHOD OF FLASH WELDING

Numan R. Stansel, Schenectady, N. Y., assignor to General Electric Company, a corporation New York Application January 2, 1936, Serial No. 57,131

5 Claims. (Cl. 219—10)

My invention relates to that form of resistance butt welding known as flash welding.

In flash welding the surfaces to be joined are heated by the passage of current in the form of an arc or arcs across a short gap between the parts until the desired thermal condition is obtained when the electric circuit is interrupted and an upsetting movement applied to the parts to force them together and make the joint. The name "flash" arises from the fact that during the heating period metal is thrown off in a shower of sparks.

It is an object of my invention to provide a flash welding procedure for steel which will lower the hardness of the metal at the joint.

It is a further object of my invention to provide a flash welding procedure for steel which will result in obtaining metal of improved characteristic at the joint.

It is also another object of my invention to provide a flash welding procedure for steel that will lessen the welding time and insure substantially uniform results.

Further objects of my invention will become apparent from a consideration of the following description of one procedure embodying my invention.

According to my improved procedure the end portions of the parts to be welded are electrically preheated prior to the welding operation. The average temperature at which heat is stored in the end portions of the parts is determined by the softening or melting of a fusible element located between these parts and the flashing period of the welding operation is initiated with the melting away of said fusible element. The softening or melting temperature of this element should be below the critical range of temperature of the parts to be welded. By reason of the heat stored in the end portions of the parts prior to the welding operation the rate of cooling of the metal in the heated zone after the weld has been completed is decreased and this results in lowering the hardness of the resulting weld, as well as in improving the quality of the metal at the joint.

My invention will be more fully described with reference to the accompanying drawing which diagrammatically represents welding apparatus and the location therein of the parts to be welded between which is interposed the fusible element by means of which the welding procedure is determined.

Referring to the drawing, the parts to be welded 10 and 11 are clamped in contact jaws 12 and 13, forming part of the welding machine. These jaws are electrically connected to the secondary 14 of a welding transformer whose primary 15 is connected to a source of alternating current supply. The end portions of parts 10 and 11 project a substantial distance from the contact jaws 12 and 13 of the welding machine in order to provide a large amount of metal for the storage of heat. The amount of heat stored in the end portions of the work parts is limited by an electrically conductive fusible element 16 placed between the ends of these parts. This element may be made of a metal or an alloy which melts below the critical range of temperature of the parts to be welded.

The welding operation is preceded by supplying a heating current through the extended end portions of the work parts until the fusible element 16 softens or begins to melt. A variable ratio transformer has been illustrated as one means of obtaining the desired current adjustments for preheating and welding. When the element 16 begins to melt it indicates that sufficient heat has been stored in the end portions of the work parts and the operator then applies full welding voltage. The flashing period of the welding operation is initiated by the melting away of the fusible element 16 and this flashing period is continued until the ends of the parts have reached the desired thermal state when they are pressed together and welded by a suitable upsetting pressure. Thereafter the parts are allowed to cool subject to the retarding action of the heat stored in their end portions by the preheating operation.

The fusible element 16 besides serving as an indicator which enables the operator to determine the amount of heat stored in the end portions of parts to be welded may also be used for determining the flashing distance between these parts by making its thickness equal to the flashing distance. The element is preferably made of some low resistance material so that abnormal heating does not occur at the ends of the work parts. By making this fusible element of some alloy material with a melting range, the welding operation is simplified, since such an alloy will give an indication of temperature by beginning to soften and this will indicate to the operator that the welding operation should be initiated by applying welding current and voltage which will in most cases be different from the preheating current and voltage.

As has been pointed out above, the fusible element should have a melting point or a melting range below the critical range of temperature of the parts to be welded. Aluminum having a melting point of 658 deg. C. will be suitable for steel which has a critical range of temperature beginning at about 700 deg. C. For such materials an alloy composed of 95% aluminum and 5% silicon and having a melting range of 575 to 630 deg. C. may also be used. Another alloy that may be used is composed of 80% aluminum and 20% manganese and has a melting range of 452 to 550 deg. C. These examples have been chosen with regard to the welding of steel railroad rails for which my procedure is particularly adapted.

By using my procedure heat at a temperature below the critical range is stored in the parts to be welded prior to the welding operation to retard the rate of cooling of the metal in the heated zone after the weld has been completed. The amount of heat stored and the amount of delay in cooling depends upon the amount of metal subjected to preheating. It is important, therefore, to have the work parts extend from the contact jaws a sufficient distance to provide the necessary amount of metal for heat storage. The amount that the parts will project from the clamping jaws will depend upon the nature of the parts, the cross-sectional area of these parts, the rate of heat flow from the contact jaws of the welding machine and surrounding temperature conditions. These jaws will usually be water-cooled and the rate of heat flow from them can be controlled. Generally, the work parts will extend from the contact jaws at least twice the thickness of these parts.

The control of the heating current and the welding current may be obtained in many ways. Instead of using a variable ratio transformer, an induction regulator in the primary circuit of the primary of the transformer or any suitable control may be used by means of which the desired range of voltages and currents are obtained between the contact jaws of the welding machine.

The welding operation above described may be performed manually or by semi-automatic or full automatic welding equipment. The flashing distance between the work parts may be controlled by a volt responsive relay or meter which in turn controls the rate at which the clamping jaws are fed toward one another. The upsetting pressure at the end of the flashing period may be initiated after a predetermined flashing period or after a predetermined quantity of material has been flashed from the ends of the work parts.

In view of the above description of one procedure embodying my invention, other procedures embodying my invention will occur to those skilled in the art and I intend, therefore, to cover all such procedures falling within the true spirit and scope of my invention, the characteristic features of which have been above described.

What I claim as new and desire to secure by Letters Patent of the United States, is:

1. The method of flash welding steel which includes the step of storing heat in the end portions of the parts to be welded prior to the welding operation by passing current through said parts and an interposed element fusible at a temperature below the critical range of temperature of said parts until said element begins to fuse, the quantity of heat stored in the end portions of said parts being sufficient to lower the hardness of the resulting weld by effectively delaying the rate of cooling of the metal in the welding zone after the weld has been completed.

2. The method of flash welding steel which includes the step of storing heat in the end portions of the parts to be welded prior to the welding operation by passing current through said parts and an interposed element having a resistance less than the resistance of said parts and fusible at a temperature below the critical range of said parts until said element begins to fuse, the quantity of heat stored in the end portions of said parts being sufficient to lower the hardness of the resulting weld by effectively delaying the rate of cooling of the metal in the welding zone after the weld has been completed.

3. The method of flash welding steel which comprises preheating the end portions of the parts to be welded by a heating current supplied therethrough, determining the amount of heat stored in said end portions by the softening of an element located therebetween and fusible at a temperature below the critical range of temperature of said parts, initiating the flashing period of the welding operation with the melting away of said fusible element, applying after said flashing period a welding pressure to join said parts together, and allowing the parts thus joined to cool subject to the retarding action of the heat stored in their end portions by said preheating, the quantity of heat stored in the end portions of said parts being sufficient to lower the hardness of the resulting weld by effectively delaying the rate of cooling of the metal in the welding zone after the weld has been completed.

4. The method of flash welding steel which comprises preheating the end portions of the parts to be welded by a heating current supplied therethrough, determining the amount of heat stored in said end portions by the softening of an element located therebetween and having a melting range below the critical range of temperature of said parts, initiating the flashing period of the welding operation with the melting away of said element, applying after said flashing period a welding pressure to join said parts together, and allowing the parts thus joined to cool subject to the retarding action of the heat stored in their end portions by said preheating, the quantity of heat stored in the end portions of said parts being sufficient to lower the hardness of the resulting weld by effectively delaying the rate of cooling of the metal in the welding zone after the weld has been completed.

5. The method of flash welding steel which comprises clamping the parts to be welded in electrically conductive contact jaws spaced from the ends of said parts more than twice the thickness of said parts, determining the flashing distance between said parts by interposing between the ends of said parts a fusible element having an electrical resistance less than the electrical resistance of said parts and melting at a temperature below the critical range of temperature of said parts, supplying a heating current though said element and the end portions of said parts by way of said jaws until said fusible element begins to melt, initiating the flashing of the ends of said parts with the melting away of said fusible element, applying a welding pressure to said parts after a predetermined flashing period and allowing said parts thus welded together to cool under the retarding effect of the heat stored in the end portions of said parts, the quantity of heat stored in the end portions of said parts being sufficient to lower the hardness of the resulting weld by effectively delaying the rate of cooling of the metal in the welding zone after the weld has been completed.

NUMAN R. STANSEL.